(12) United States Patent
Sekine et al.

(10) Patent No.: US 7,490,006 B2
(45) Date of Patent: Feb. 10, 2009

(54) METHOD OF GENERATING MAP UPDATE PROCESS DATA, MAP UPDATE METHOD, AND MAP UPDATE APPARATUS

(75) Inventors: Minoru Sekine, Tokyo (JP); Masaaki Ohira, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 468 days.

(21) Appl. No.: 11/349,533

(22) Filed: Feb. 7, 2006

(65) Prior Publication Data

US 2006/0190507 A1 Aug. 24, 2006

(30) Foreign Application Priority Data

Feb. 10, 2005 (JP) ............................. 2005-033910
Dec. 7, 2005 (JP) ............................. 2005-352807

(51) Int. Cl.
*G01C 21/00* (2006.01)
(52) U.S. Cl. .................................... 701/208; 707/104.1
(58) Field of Classification Search .................. None
See application file for complete search history.

(56) References Cited

U.S. PATENT DOCUMENTS

| 6,230,098 | B1 * | 5/2001 | Ando et al. ............... 701/208 |
| 6,453,233 | B1 | 9/2002 | Noriko |
| 6,604,236 | B1 * | 8/2003 | Draper et al. ............... 717/170 |
| 6,728,633 | B2 * | 4/2004 | Mikuriya et al. ............ 701/208 |
| 7,082,443 | B1 * | 7/2006 | Ashby ........................ 707/201 |
| 2004/0083051 | A1 | 4/2004 | Ohno et al. |
| 2004/0125989 | A1 | 7/2004 | Kimura |
| 2004/0135705 | A1 | 7/2004 | Umezu et al. |
| 2005/0203937 | A1 | 9/2005 | Nomura |

FOREIGN PATENT DOCUMENTS

| JP | 2001067458 | 3/2001 |
| JP | 2002-296042 | * 10/2002 |
| WO | WO 03/074972 A1 | * 9/2003 |

* cited by examiner

Primary Examiner—Michael J. Zanelli
(74) Attorney, Agent, or Firm—Brinks Hofer Gilson & Lione

(57) ABSTRACT

A method of generating map update process data used for updating old map data including a great number of files to new map data includes the steps of using an old map file to be updated and a new map file to generate differential data; calculating a relative size of the differential data; and using the new map file if the relative size is higher than a predetermined value and using the differential data if the relative size is lower than the predetermined value to form the map update process data.

23 Claims, 19 Drawing Sheets

FIG. 3

| |
|---|
| NEW FILE: DATA A |
| OLD FILE: DATA 1 SPECIFICATION (INITIAL ADDRESS OF DATA 1 + SIZE) |
| NEW FILE: DATA B |
| OLD FILE: DATA 3 SPECIFICATION (INITIAL ADDRESS OF DATA 3 + SIZE) |
| NEW FILE: DATA C |
| OLD FILE: DATA 2 SPECIFICATION (INITIAL ADDRESS OF DATA 2 + SIZE) |
| NEW FILE: DATA D |

FIG. 10

| TYPE OF RECORDING MEDIUM | SIZE OF UPDATE PROCESS DATA |
|---|---|
| DVD | 8.5GB |
| MEMORY CARD | 1.0GB |
| HDDVD | 30.0GB |
| CD-ROM | 700MB |
| ⋮ | ⋮ |

FIG. 17A

DIFFERENCE UPDATE SUPPORTING RECORD

| PROCESSING STATE (WHETHER TARGET DIRECTORY AND FILES AND SUBDIRECTORIES BELOW TARGET DIRECTORY HAVE BEEN PROCESSED) |
|---|
| NAME OF TARGET DIRECTORY |
| NUMBER OF SUBDIRECTORIES |
| NUMBER OF FILES BELOW THIS DIRECTORY |
| DIFFERENCE UPDATE SUPPORTING RECORD NUMBERS CORRESPONDING TO SUBDIRECTORIES |
| DIFFERENCE UPDATE INFORMATION RECORD NUMBERS CORRESPONDING TO FILES BELOW THIS DIRECTORY |

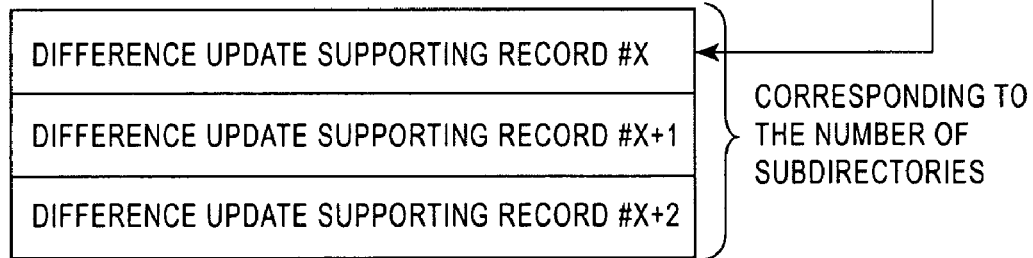

DIFFERENCE UPDATE SUPPORTING RECORD #X
DIFFERENCE UPDATE SUPPORTING RECORD #X+1
DIFFERENCE UPDATE SUPPORTING RECORD #X+2

} CORRESPONDING TO THE NUMBER OF SUBDIRECTORIES

FIG. 17B

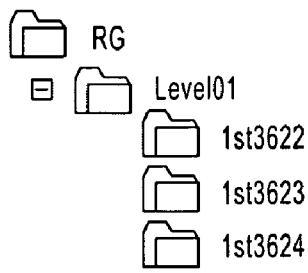

RG
　Level01
　　1st3622
　　1st3623
　　1st3624

METHOD OF GENERATING MAP UPDATE PROCESS DATA, MAP UPDATE METHOD, AND MAP UPDATE APPARATUS

BACKGROUND OF THE INVENTION

1. Field of the Invention

The present invention relates to methods of generating map update process data, map update methods, and map update apparatuses. More particularly, the present invention relates to a method of generating map update process data, which updates old map data for navigation to new map data, to a map update method, and to a map update apparatus.

2. Description of the Related Art

Navigation apparatuses read out map data corresponding to the current position of a vehicle from recording media, including a compact disc-read only memory (CD-ROM), digital versatile disk (DVD), and hard disk drive (HDD), and display the map data on a display screen. In addition, the navigation apparatuses display a mark of the vehicle at a fixed position on the display screen and scroll the map as the vehicle moves. The map data includes (1) a road layer having node data, road link data, and intersection data, (2) a background layer in which objects on the map are displayed, and (3) a character layer in which, for example, the names of municipalities are displayed. Map images displayed on the display screen are generated on the basis of the background layer and the character layer, and map matching and searching for guidance routes are performed on the basis of the road layer. The navigation apparatuses further have route guidance functions for searching for the guidance routes from departure places to destinations and displaying the guidance routes, and point of interest (POI) display functions for displaying predetermined POI marks (landmarks) on the map.

The map data recorded in the recording media becomes obsolete over time because of changes of topographic data due to, for example, construction of new roads, opening/closing of facilities, land improvement, and others. Accordingly, for example, Japanese Unexamined Patent Application Publication No. 2003-337027 discloses a technology of storing update map data in a non-volatile memory in a navigation apparatus for every block and reading out the maps of blocks where the map data has been updated from the non-volatile memory and reading out the maps of blocks where the map data has not been updated from a recording medium (for example, CD-ROM) to perform navigation control. In this technology, the current map data of the updated block is read out from a removable memory and is written in the non-volatile memory, such as an HDD, in units of meshes, and it is determined whether the update map data of all the meshes in the block is stored in the non-volatile memory by referring to block management information. The map information is read out from the recording medium (for example, CD-ROM) if the update map data of all the meshes in the block is not stored in the non-volatile memory, and the map information is read out from the non-volatile memory if the update map data of all the meshes in the block is stored in the non-volatile memory, in order to perform the navigation control by using the map data. However, with this method, it is necessary to use both the recording medium, such as a CD-ROM or a DVD, and the non-volatile memory, such as an HDD, to perform the navigation control, thus requiring complicated control. In addition, since the recording medium, such as a CD-ROM or a DVD, for recording the map is always required for the navigation control in the technology in the related art, it is necessary to provide a music CD player and a DVD player separately from the map player and, therefore, the hardware is disadvantageously increased in size.

On this account, a method of recording map data in a map recording unit, such as an HDD, and replacing the map data in the HDD with current map data if the map data has been changed is disclosed in Japanese Unexamined Patent Application Publication No. 2004-287705. In this method, a user acquires the difference between the new map data and the old map data from a center or buys an update DVD in which the difference between the new map data and the old map data is recorded to replace the old map data in the HDD with the new map data. With this method, it is possible to perform the navigation control by using the map data recorded in the HDD, to use a DVD player both as the music and video player and the map player, and to listen to the music or watch the video while performing the navigation control.

FIG. 20 schematically illustrates creation of an update DVD with a map differential-data generating apparatus in the related art.

Since the map data is formed of multiple files, the map differential-data generating apparatus (not shown) extracts the difference between a new map file NFL of a new version (Version 2) and an old map file OFL of an old version (Version 1) for every file to generate differential data $DFD_1$ to $DFD_N$. The map differential-data generating apparatus then collects all the differential data to generate update data and writes the update data in a DVD to create an update DVD 1.

FIG. 21 illustrates an update process in a navigation apparatus that uses an update DVD to update old map data in a hard disk to new map data. In the update of the map, a hard disk reading unit 2 in the navigation apparatus reads out an old map file OFL of Version 1 from a hard disk 3 and supplies the old map file OFL to an update processing unit 4. A DVD playback unit 5 reads out differential data from the update DVD 1 and supplies the differential data to the update processing unit 4. The update processing unit 4 uses the differential data and the old map file OFL of Version 1 to generate a new map file NFL of Version 2 for every file. A hard disk writing unit 6 replaces the old map file OFL with the new map file NFL.

However, it takes two hours or more to complete the update of the map in the method disclosed in Japanese Unexamined Patent Application Publication No. 2004-287705, and this method requires a time longer than in a case where the new map file is stored in the DVD from which the new map file is copied to the HDD. This is because it takes a long time to create the new map file from the old map file and the differential data and to read the old map file. As a result, there is a problem in that another music CD or video DVD cannot be listened to or watched for a long time when the update DVD is used in the update of the map.

On this account, a method of writing new map data in a DVD without using a DVD for differential data and directly copying the new map data in an HDD is supposed. However, since the amount of the current map data is around 15 GB, it is necessary to provide two DVDs each having a capacity of 8.5 GB in order to store all the map data. The division of the map data into two DVDs inhibits a background update process from being carried out. The background update process will now be described. When the navigation apparatus performs a navigation process in parallel with a map update process, the navigation apparatus gives preference to the navigation process over the map update process, that is, the apparatus performs the map update process when the navigation process is not performed. The map update process is performed, for example, from the north to the south (a full update process). If the map file of a block where the update has not been completed is requested in the navigation process, the full update process is suspended to update the map data of the block (an occasional update process) and the full update process is resumed after the occasional update process is completed. The navigation apparatus performs the navigation process on the basis of the new map file that is occasionally updated. The above map update process is referred to as the background update process.

However, dividing the map data into two DVDs inhibits the background update process.

SUMMARY OF THE INVENTION

It is desirable to shorten the time required for the map update process.

It is also desirable to allow a background update process to be performed.

According to an embodiment of the present invention, a method of generating map update process data used for updating old map data including a great number of files to new map data includes the steps of using an old map file to be updated and a new map file to generate differential data; calculating a relative size of the differential data; and using the new map file if the relative size is higher than a predetermined value and using the differential data if the relative size is lower than the predetermined value to form the map update process data.

The method of generating the map update process data may further include the step of generating data indicating whether a map update process file forming the map update process data is based on the new map file or on the differential data to include the generated data in the map update process data.

The method of generating the map update process data may further include the step of writing the map update process data for all the old map files to be updated in a recording medium to form an update recording medium.

The method of generating the map update process data may further include the step of changing the predetermined value on the basis of a capacity of the update recording medium.

In the method of generating the map update process data, it is preferable that the relative size be a relative size of the differential data with respect to the size of the new map file and that the predetermined value be set such that the entire map update process data is recorded in one recording medium.

In the method of generating the map update process data, it is preferable that the map update process data be structured in a directory structure, and that the map update process file in the directory structure include the data indicating whether the map update process file is based on the new map file or on the differential data.

According to another embodiment of the present invention, an apparatus of generating map update process data used for updating old map data including a great number of files to new map data includes a map file input unit that receives an old map file and a new map file; and a processing unit that generates differential data between the old map file to be updated and the new map file, that calculates a relative size of the differential data, that uses the new map file to generate a map update process file if the relative size is higher than a predetermined value and uses the differential data to generate the map update process file if the relative size is lower than the predetermined value, and that uses the generated map update process files to form the map update process data.

The apparatus of generating the map update process data may further include an update-recording-medium forming unit that writes the map update process data in a recording medium to form an update recording medium.

The processing unit preferably changes the predetermined value on the basis of a capacity of the update recording medium.

The processing unit preferably calculates the relative size of the differential data with respect to the size of the new map file as the relative size.

The processing unit preferably generates data indicating whether the map update process file is based on the new map file or on the differential data to include the generated data in the map update process data.

According to another embodiment of the present invention, a map update method for a navigation apparatus that uses map update process data, for updating old map data including a great number of files to new map data, to update a map includes the steps of determining whether a map update process file forming the map update process data is based on a new map file or differential data; replacing an old map file stored in a map data storage unit in the navigation apparatus with the new map file if the map update process file is based on the new map file; and generating the new map file by using the differential data and the old map file to replace the old map file stored in the map data storage unit with the new map file if the map update process file is based on the differential data.

The map update method may further include the steps of reading out the map update process file based on the new map file, among the map update process files forming the map update process data, from a recording medium and replacing the old map file stored in the map data storage unit in the navigation apparatus with the new map file; and reading out all the map update process files based on the differential data, among the map update process files, from the recording medium and storing the map update process files in a memory. Subsequently, the map update process files based on the differential data and the old map file are used to generate the new map file, and the old map file stored in the map data storage unit is replaced with the new map file.

The map update method may further include the steps of acquiring the map update process file from the recording medium and acquiring the old map file from the map data storage unit; writing the updated data in the map update process file after an update process is finished and counting the number of updated files; and determining that the update process is completed if the counted number of updated files coincides with the total number of updated files, recorded in the recording medium.

According to another embodiment of the present invention, a navigation apparatus that uses map update process data, for updating old map data including a great number of files to new map data, to update a map includes a map data storage unit that stores the old map data; a map data reading-writing control unit that reads out the old map data from the map data storage unit and writes the new map data in the map data storage unit; a map-update-process data input unit that receives the map update process data; and a map update processing unit that determines whether a map update process file forming the map update process data is based on a new map file or on differential data, that replaces an old map file stored in the map data storage unit with the new map file if the map update process file is based on the new map file, and that uses the differential data and the old map data stored in the map data storage unit to generate the new map file and replaces the old map file stored in the map data storage unit with the new map file if the map update process file is based on the differential data.

According to another embodiment of the present invention, a map data update method combines the above method of generating the map update process data used for updating the old map data including a great number of files to the new map data and the above map update method, which uses the map update process data to update the map.

According to another embodiment of the present invention, a map data update system includes the above apparatus of generating the map update process data used for updating the old map data including a great number of files to the new map data and the above navigation apparatus, which uses the map update process data to update the map.

According to the present invention, since the new map file is used if the relative size of the differential data is higher than the predetermined value and the differential data is used if the relative size of the differential data is lower than the predetermined value to generate the map update process data, the map update process data can be recorded in one recording medium and a larger number of new map files can be included in the map update process data. As a result, it is possible to shorten the time required to replace the old map file with the new map file to listen to or watch a music or video CD (DVD) quickly. Additionally, since the map update process data can be recorded in one recording medium, the background update process can be performed.

In addition, according to the present invention, since the predetermined value is set on the basis of the capacity of the recording medium having the map update process data, the map update processing data having an optimal size can be generated and written in the recording medium even if the capacity of the recording medium is changed depending on the type of the navigation apparatus.

Furthermore, according to the present invention, since the data indicating whether the map update process file is based on the new map file or on the differential data is included in the map update process data, the navigation apparatus can use the indication data to easily determine whether the map update process file is based on the new map file or on the differential data and to update the old map file in the map update.

Furthermore, according to the present invention, the relative size is the relative size of the differential data with respect to the size of the new map file and the predetermined value is set such that the map update process data is recorded in one recording medium, so that the map update process data can be surely recorded in one recording medium.

Furthermore, according to the present invention, the map update process data based on the new map file is used to update the old map file stored in the map data storage unit; next, all the map update process files based on the differential data are read out from the recording medium and are stored in the memory; and, finally, the map update process files based on the differential data, stored in the memory, are used to perform the update process. Accordingly, it is possible to listen to or watch a music or video CD (DVD) more quickly because the update recording medium (CD or DVD) is not required after the map update process files based on the differential data are stored in the memory.

BRIEF DESCRIPTION OF THE DRAWINGS

FIG. 3 illustrates the differential data;

FIG. 10 illustrates a table of recording media of different types and sizes of the update process data;

FIGS. 17A and 17B include diagrams illustrating a difference update supporting record;

DESCRIPTION OF THE PREFERRED EMBODIMENTS

A map data update system according to an embodiment of the present invention includes an apparatus for generating map update process data used for updating old map data including a great number of files to new map data and a navigation apparatus for using the map update process data to update a map.

The apparatus for generating the map update process data uses an old map file to be updated and a new map file to generate differential data, calculates a relative size of the differential data, and uses the new map file to generate the map update process file if the relative size is higher than a predetermined value or uses the differential data to generate the map update process file if the relative size is lower than the predetermined value, and writes the map update process data in a recording medium to form an update recording medium.

The navigation apparatus replaces the old map file stored in a map data storage unit, such as a hard disk, with the new map file if the map update process file forming the map update process data, read out from the update recording medium, is based on the new map file. The navigation apparatus uses the differential data and the old map data to generate the new map file and replaces the old map file stored in the map data storage unit with the new map file if the map update process file is based on the differential data.

In the manner described above, it is possible to shorten the time required for the map update and it is also possible to perform a background update process.

Outline

Figure 1:
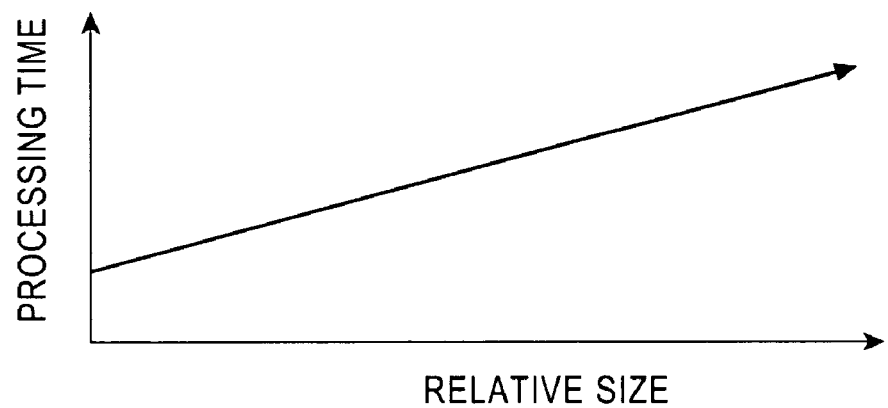
FIG. 1 shows the relationship between a relative size η and processing time.

A processing time required to use differential data between an old map file and a new map file to replace the old map file stored in a map data storage unit in a navigation apparatus with the new map file becomes longer as the relative size η of the differential data increases, as shown in FIG. 1. The relative size η is given by, for example, the following equation:

[Formula 1]

$$\eta = (\text{size of differential data} \times 100)/(\text{size of new data}) \quad (\%) \quad (1)$$

Figure 2:
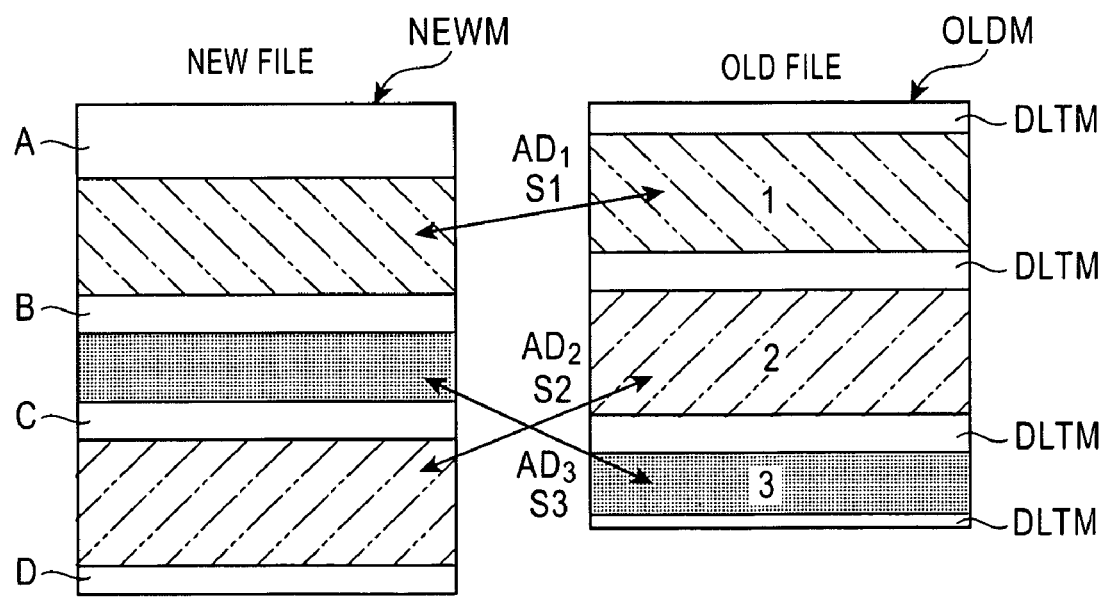
FIG. 2 illustrates a method of generating differential data.

FIG. 2 illustrates a method of generating the differential data. In this method, new map data NEWM is compared with old map data OLDM in units of bytes, and pairs of (1) initial addresses and sizes of areas of the old map data, which areas match with areas of the new map data, and (2) new map data that does not match with the old map data are sequentially arranged to generate the differential data. Referring to FIG. 2, areas identified by two-way arrows are common to the new map data and the old map data. Unmatched area data DLTM in the old map data OLDM is discarded, and unmatched area data A to D in the new map data NEWM is added as the differential data. The area of the old map data, which matches with an area of the new map data, is identified by an initial address $AD_i$ and a size $S_i$ of the area. In the example in FIG. 2, the differential data has the following structure shown in FIG. 3:

New map file: Data A
Old map file: Data 1 specification (initial address $AD_1$, size $S_1$)
New map file: Data B
Old map file: Data 3 specification (initial address $AD_3$, size $S_3$)
New map file: Data C
Old map file: Data 2 specification (initial address $AD_2$, size $S_2$)
New map file: Data D The size of the data portion in which the old map file matches with the new map file increases, the number of portions in which the old map file does not match with the new map file decreases, and the time required for the update process becomes short, as the relative size becomes lower. In contrast, the size of the data portion in which the old map file does not match with the new map file increases, the number of portions in which the old map file does not match with the new map file increases, and the time required for the update process becomes long, as the relative size becomes higher. As a result, the relationship between the relative size and the processing time, as shown in FIG. 1, is established.

Storing the new map file in an update DVD from which the new map file is copied to a hard disk requires a time shorter than in a case where the differential data and the old map file are used to generate the new map file that is written in the hard disk. However, the amount of data in a case where the new map file is used as map update process data (a map update process file) is larger than that in a case where the differential data is used as the map update process file. In other words, storing the new map file in the update DVD is of advantage when weight is given to the processing time, while storing the differential data in the update DVD is of advantage when weight is given to the amount of data.

Accordingly, the new map file is used as the map update process file that is recorded in the update DVD if the relative size η of the differential data is higher than a predetermined value SP, while the differential data is used as the map update process file that is recorded in the update DVD if the relative size η of the differential data is lower than the predetermined value SP. With this method, all the map data for the update process (all the map update process files) can be recorded in one update DVD and a greater number of new map files can be recorded in the update DVD as the map update process files, so that the processing time required for updating the map can be shortened. The predetermined value SP is adjusted such that the update process data can be recorded, e.g., in one DVD having a capacity of 8.5 GB.

Figure 4:
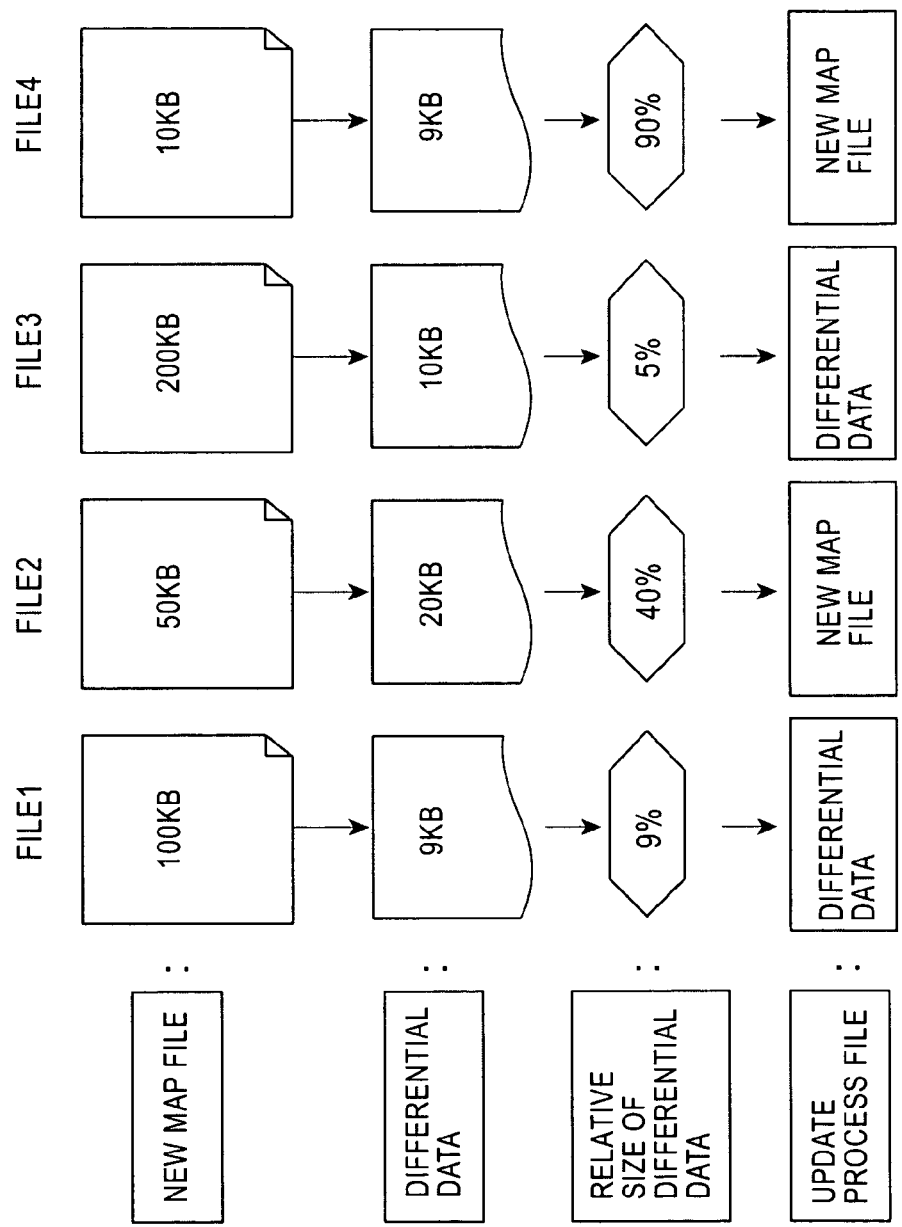
FIG. 4 illustrates how to determine whether a new map file or the differential data is to be used as a map update process file.

FIG. 4 illustrates how to determine whether the new map file or the differential data is to be used as the map update process file. In the example shown in FIG. 4, the predetermined value SP is set to 10 (%). Since File 1 has a relative size η of 9% and File 3 has a relative size η of 5%, which are lower than the predetermined value SP, the differential data is used as the map update process file for Files 1 and 3. In contrast, File 2 has a relative size η of 40% and File 4 has a relative size η of 90%, which are higher than the predetermined value SP, so that the new map file is used as the map update process file for Files 2 and 4. Although four files are used in FIG. 4 for simplicity, about a hundred thousand files may actually be used.

Map Data Update System

Figure 5:
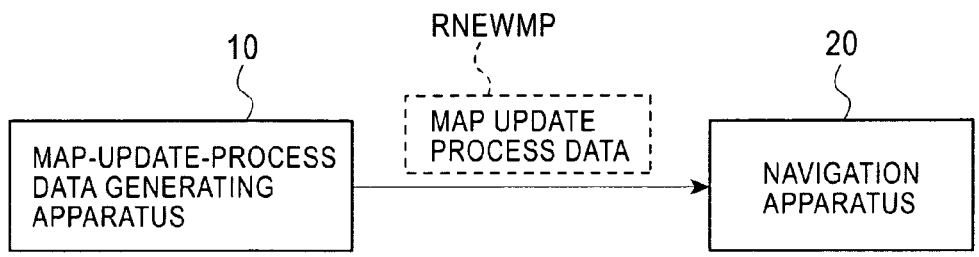
FIG. 5 shows an example of the structure of a map data update system.

FIG. 5 shows an example of the general structure of a map data update system. The map data update system includes a map-update-process data generating apparatus 10 and a navigation apparatus 20. The map-update-process data generating apparatus 10 generates map update process data RNEWMP used for updating old map data to new map data. The navigation apparatus 20 uses the map update process data to update a map.

The map-update-process data generating apparatus 10 records the map update process data RNEWMP in a recording medium, such as a DVD, and supplies the map update process data RNEWMP recorded in the recording medium to the navigation apparatus 20. The map-update-process data generating apparatus 10 may be connected to the navigation apparatus 20 through a communication line (for example, a radio transmission line or the Internet), and the map-update-process data generating apparatus 10 may transmit the map update process data RNEWMP to the navigation apparatus 20 in response to a request from the navigation apparatus 20 over the communication line.

Map-update-process Data Generating Apparatus

Figure 6:
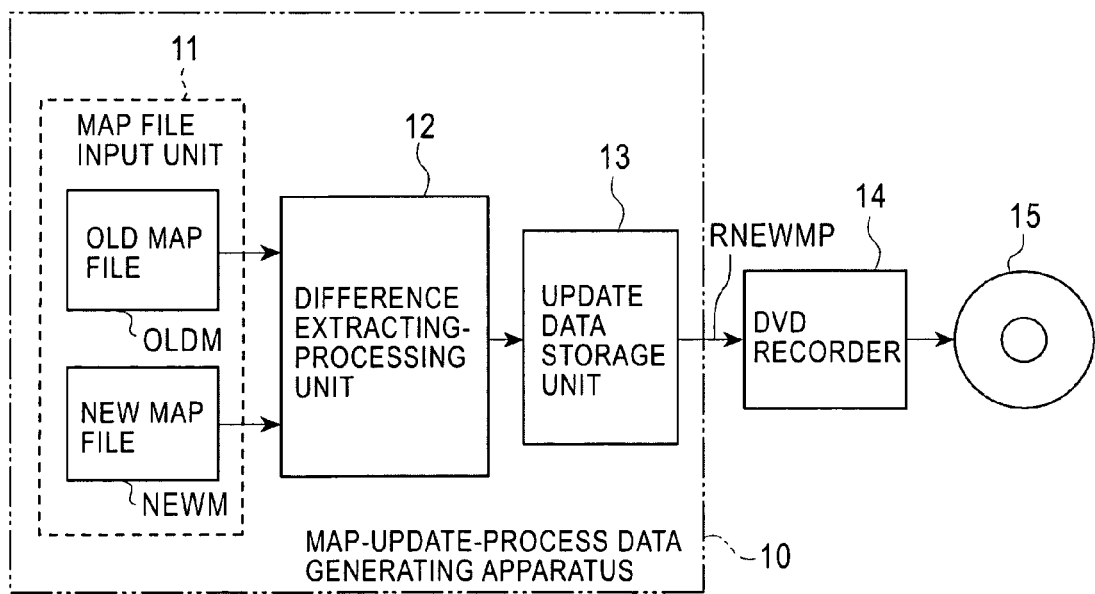
FIG. 6 is a block diagram showing an example of the structure of a map-update-process data generating apparatus.

FIG. 6 is a block diagram showing an example of the structure of the map-update-process data generating apparatus 10, in which the map update process data RNEWMP is written in a DVD. In the map-update-process data generating apparatus 10, a map file input unit 11 supplies the old map file OLDM and the new map file NEWM to a difference extracting-processing unit 12. The difference extracting-processing unit 12 generates differential data between the old map file OLDM and the new map file NEWM for every file in the manner described above with reference to FIGS. 2 and 3 and calculates the relative size η of the differential data. The difference extracting-processing unit 12 uses the new map file NEWM to generate the map update process data (the map update process file) if the relative size η is higher than the predetermined value SP and uses the differential data to generate the map update process file if the relative size η is lower than the predetermined value SP, and stores the generated map update process file in an update data storage unit 13. The update data storage unit 13 stores the map update process file for every old map file to be updated as the map update process data RNEWMP and supplies the map update process data RNEWMP to a DVD recorder 14 in response to a request from the DVD recorder 14. The DVD recorder 14 writes the map update process data RNEWMP in a DVD to create an update DVD 15. An arbitrary recording medium, such as a CD-ROM or a semiconductor memory, may be used instead of the DVD.

Figure 7:
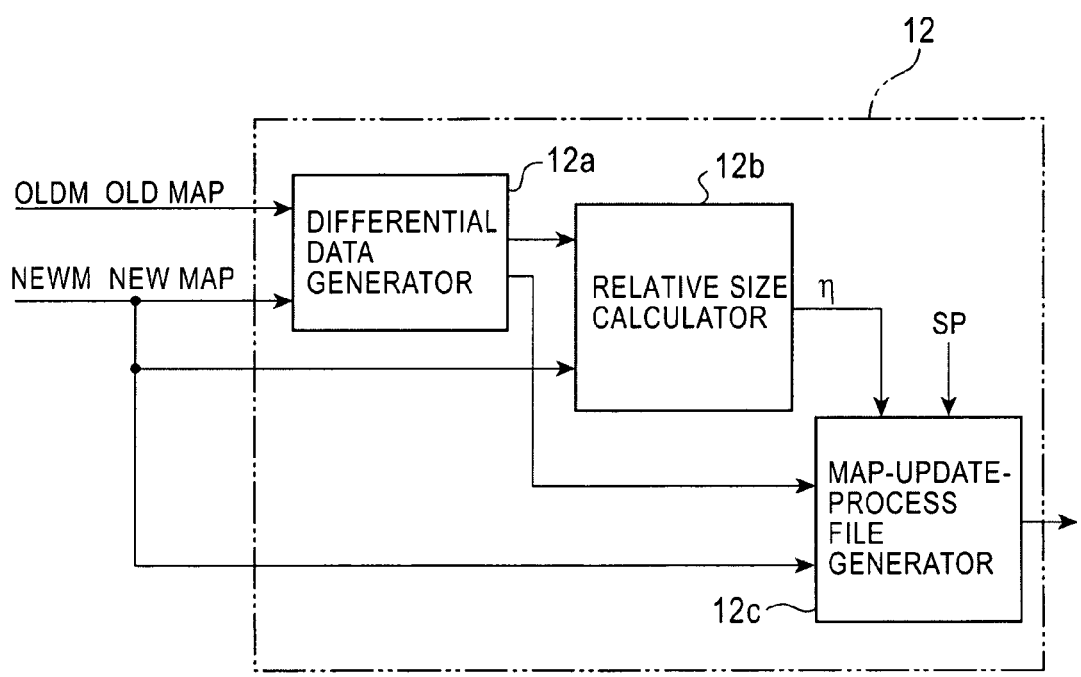
FIG. 7 is a functional block diagram of a difference extracting-processing unit.

FIG. 7 is a functional block diagram of the difference extracting-processing unit 12. In the difference extracting-processing unit 12, a differential data generator 12a generates differential data between the old map file OLDM and the new map file NEWM for every file. A relative size calculator 12b calculates the relative size η of the differential data according to Equation (1). A map-update-process file generator 12c uses the new map file NEWM to generate the map update process file if the relative size η is higher than the predetermined value SP and uses the differential data to generate the map update process file if the relative size η is lower than the predetermined value SP, and stores the generated map update process file in the update data storage unit 13.

Process of Generating Map Update Process Data

Figure 8:
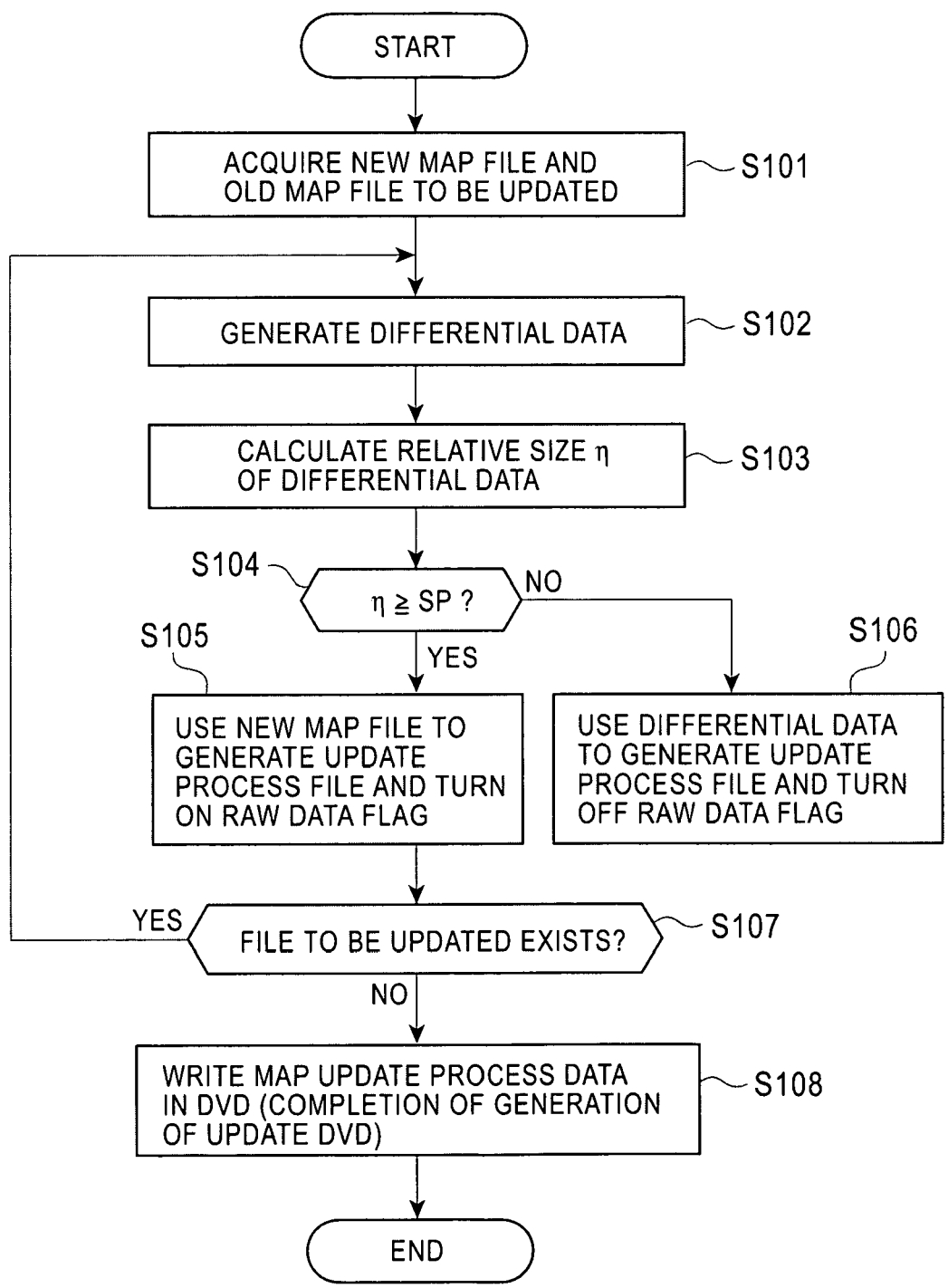
FIG. 8 is a flowchart showing a process of generating map update process data.

FIG. 8 is a flowchart showing a process of generating the map update process data in the difference extracting-processing unit 12 in the map-update-process data generating apparatus 10.

In Step S101, the process reads out a new map file and an old map file to be updated. Specifically, the process reads out the new map file and the old map file and compares the new map file with the old map file. If the new map file does not match with the old map file, the process determines that the old map file is to be updated and terminates Step S101. If the new map file matches with the old map file, the process determines that the old map file is not be updated, reads out the subsequent new map file and old map file, and compares the new map file with the old map file. The process repeats Step S101 until the new map file that does not match with the old map file is detected.

In Step S102, the process generates differential data between the old map file to be updated and the new map file. In Step S103, the process calculates the relative size η of the differential data according to Equation (1). In Step S104, the process compares the rate of size η with the predetermined value SP. If the η≧SP, then in Step S105, the process uses the new map file to generate the map update process file, turns on a raw data flag, and stores the raw data flag in the update data storage unit 13. If η<SP, then in Step S106, the process uses the differential data to generate the map update process file, turns off the raw data flag, and stores the raw data flag in the update data storage unit 13.

In Step S107, the process determines whether another file to be updated exists. If another file to be updated exists, the process repeats Step S102 and the subsequent steps. If another file to be updated does not exist, the process writes the map update process data in the map update process file in the DVD to create the update DVD 15.

The process counts the number of the old map files to be updated in Step S101, and writes the counted number in the DVD as the total number of files to be updated in Step S108.

Determining Predetermined Value SP

Different navigation apparatuses have map data of different sizes. In the case of a navigation apparatus having map data of a smaller size, the update process data can be stored in a memory card to perform the update process. If the map data is increased in size, the update process data cannot be stored in the DVD and, therefore, it is necessary to store the update process data in, for example, a high-definition DVD (HD-DVD) or a Blu-ray disc. The recording medium in which the update process data is stored depends on the navigation apparatus, and the maximum amount of data that can be stored in the recording medium is equal to the maximum amount of the update process data. It is necessary to set the predetermined SP so as not to exceed the maximum amount of the update process data, that is, the capacity of the recording medium to generate the map update process data RNEWMP. With this setting, it is possible to generate the map update process data RNEWMP optimal for the recording medium and to write the map update process data RNEWMP in the recording medium.

Figure 9:
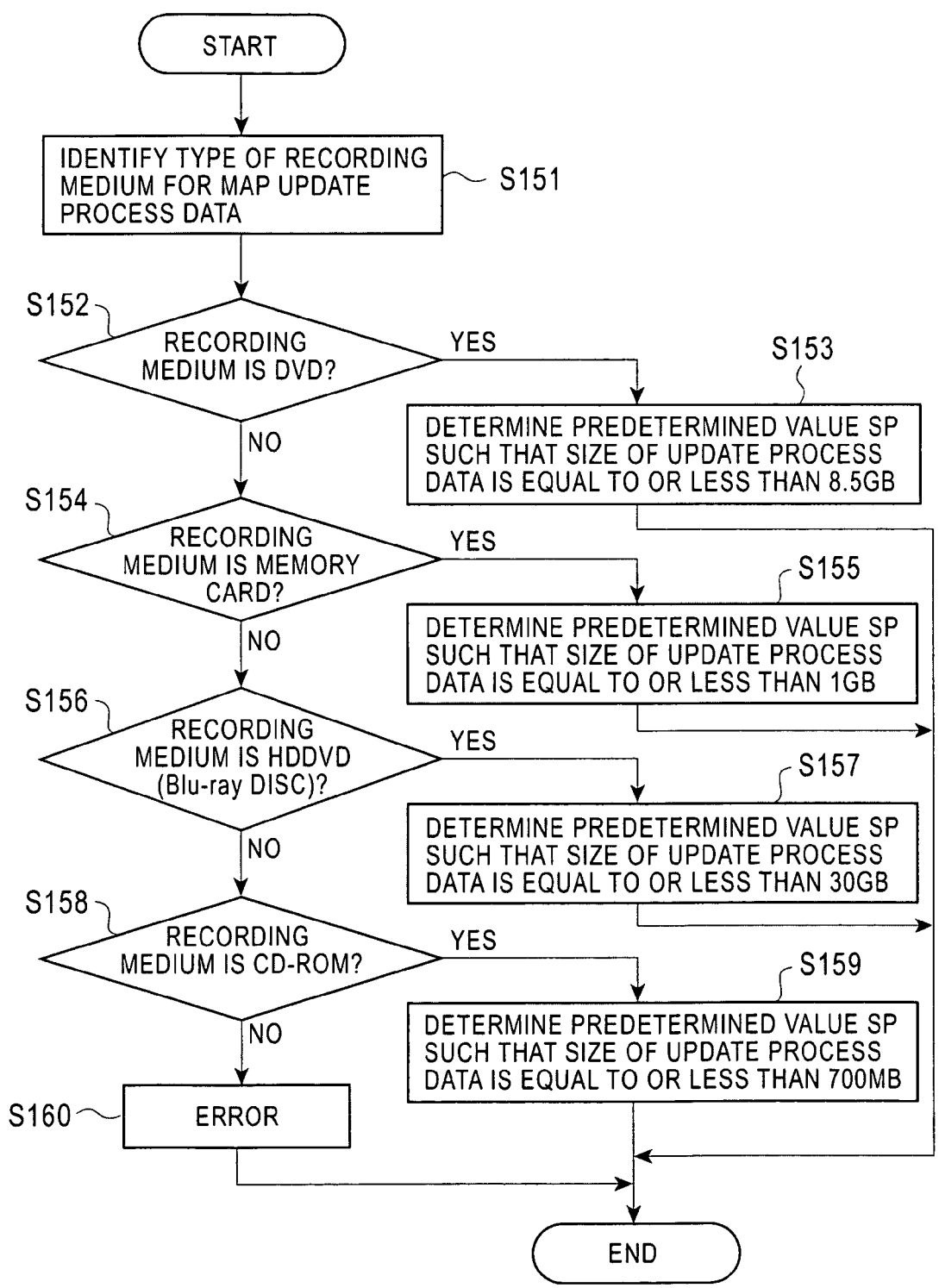
FIG. 9 is a flowchart showing a process of determining a predetermined value.

FIG. 9 is a flowchart showing a process of determining the predetermined value SP in the map-update-process data generating apparatus 10. A table of the storage capacities of different types of recording media for the update process data (the size DS of the update process data) is stored in memory in advance, as shown in FIG. 10. After the type of recording medium is detected, the capacity of the recording medium, stored in the memory, is acquired and the predetermined value SP is determined such that the size of the update process data is within the acquired capacity.

Referring to FIG. 9, in Step S151, the map-update-process data generating apparatus 10 identifies a type of recording medium for the update process data. The type of recording medium may be manually entered or may be entered with an input device used for writing the map update process data in the recording medium.

Next, the map-update-process data generating apparatus 10 acquires the size DS of the update process data corresponding to the type of recording medium from the table shown in FIG. 10 and determines the predetermined value SP such that the size of the map update process data RNEWMP to be generated is equal to or less than the size DS of the update process data. Specifically, in Step S152, the map-update-process data generating apparatus 10 determines whether the recording medium is a DVD. If the recording medium is a DVD, then in Step S153, the map-update-process data generating apparatus 10 determines the predetermined value SP such that the size of the map update process data RNEWMP is equal to or less than 8.5 GB.

In Step S154, the map-update-process data generating apparatus 10 determines whether the recording medium is a memory card. If the recording medium is a memory card, then in Step S155, the map-update-process data generating apparatus 10 determines the predetermined value SP such that the size of the map update process data RNEWMP is equal to or less than 1 GB.

In Step S156, the map-update-process data generating apparatus 10 determines whether the recording medium is an HDDVD or Blu-ray disc. If the recording medium is an HDDVD or Blu-ray disc, then in Step S157, the map-update-process data generating apparatus 10 determines the predetermined value SP such that the size of the map update process data RNEWMP is equal to or less than 30 GB.

In Step S158, the map-update-process data generating apparatus 10 determines whether the recording medium is a CD-ROM. If the recording medium is a CD-ROM, then in Step S159, the map-update-process data generating apparatus 10 determines the predetermined value SP such that the size of the map update process data RNEWMP is equal to or less than 700 MB.

If the recording medium is not any of the above recognized media, then in Step S160, the map-update-process data generating apparatus 10 determines that an error occurs and terminates the process.

Navigation Apparatus

Figure 11:
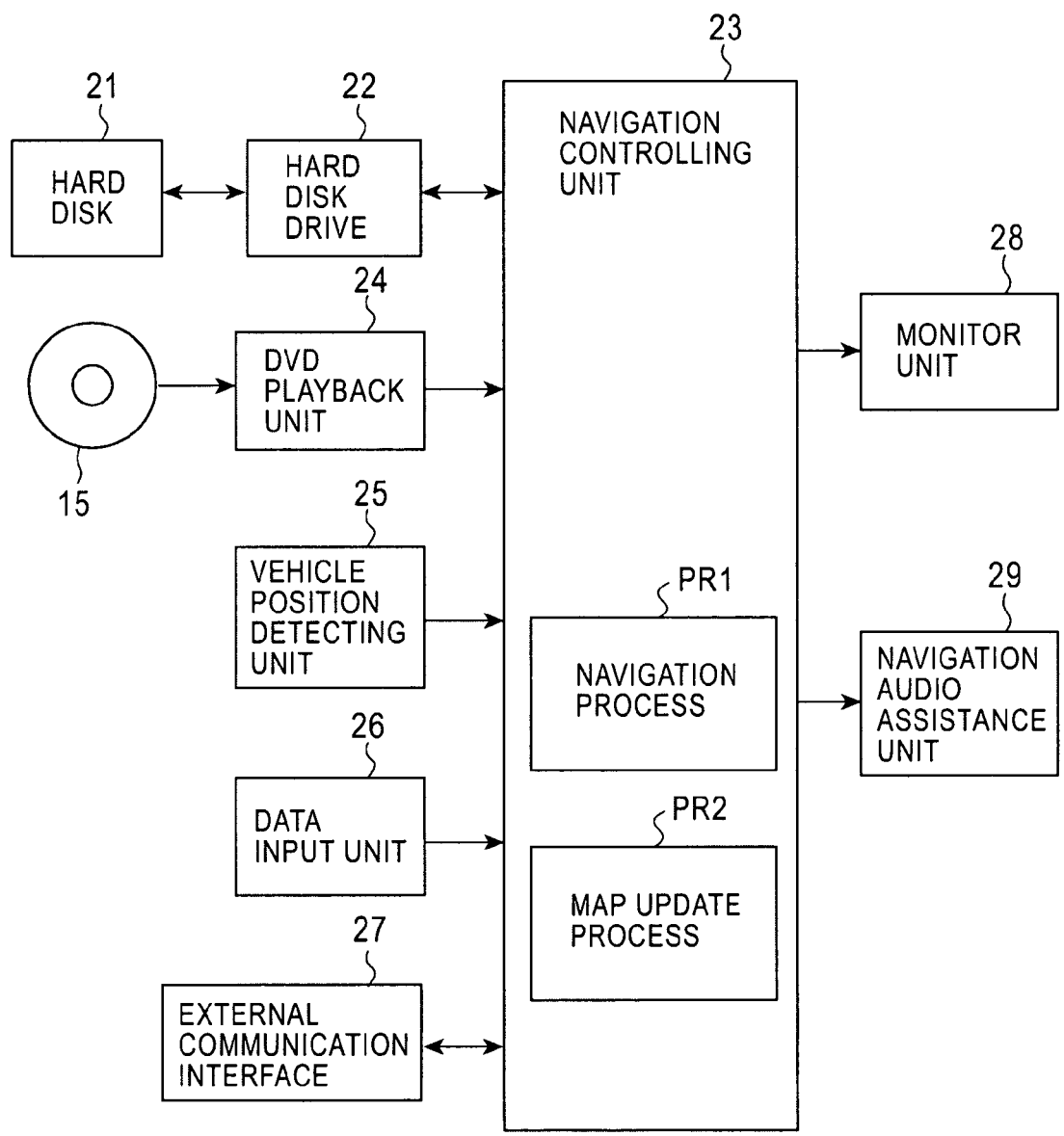
FIG. 11 is a block diagram showing an example of the structure of a navigation apparatus.

FIG. 11 is a block diagram showing an example of the structure of a navigation apparatus. A map storage unit (for example, a hard disk HD) 21 stores map data for navigation, recorded therein in a file format. A hard disk drive 22 reads out the map data from the hard disk 21 in accordance with an instruction issued from a navigation controlling unit 23 and writes the new map data in the hard disk 21. A DVD playback unit 24 reads out the map update process data RNEWMP from the update DVD 15 and supplies the map update process data RNEWMP to the navigation controlling unit 23. A vehicle position detecting unit 25 detects the position of a car and supplies the detected position to the navigation controlling unit 23 to allow the navigation apparatus to perform navigation control by using the map data. A data input unit 26 is, for example, a touch panel or a remote controller. Various commands and a variety of data are entered with the data input unit 26. An external communication interface 27 communicates with external devices through, for example, a mobile phone or the Internet. The map update process data RNEWMP may be acquired by communicating with map-update-process data generating apparatus 10, instead of being read out from the update DVD 15. A monitor unit 28 is used for displaying the map for navigation and for displaying images of operation menus. A navigation audio assistance unit 29 provides a direction (for example, right-hand turn or left-hand turn or the distance to an intersection) at the next intersection to a user by voice.

The navigation controlling unit 23 includes a navigation process section PR1 and a map update process section PR2 to perform a navigation process and a map update process. In the map update process, the navigation controlling unit 23 uses the map update process data read out from the update DVD 15 to update the map data (old map data) stored in the hard disk 21. When the navigation apparatus performs the navigation process in parallel with the map update process, the navigation apparatus gives preference to the navigation process over the map update process, that is, performs the map update process when the navigation process is not performed. The map update process is performed, for example, from the north to the south (a full update process). If the map file of a block where the update has not been completed is requested in the navigation process, the full update process is suspended to update the map data of the block (an occasional update process), and the full update process is resumed after the occasional update process is completed. The navigation apparatus performs the navigation process on the basis of the new map file that is occasionally updated. The above map update process is referred to as background control.

Map Update Process

Figure 12:
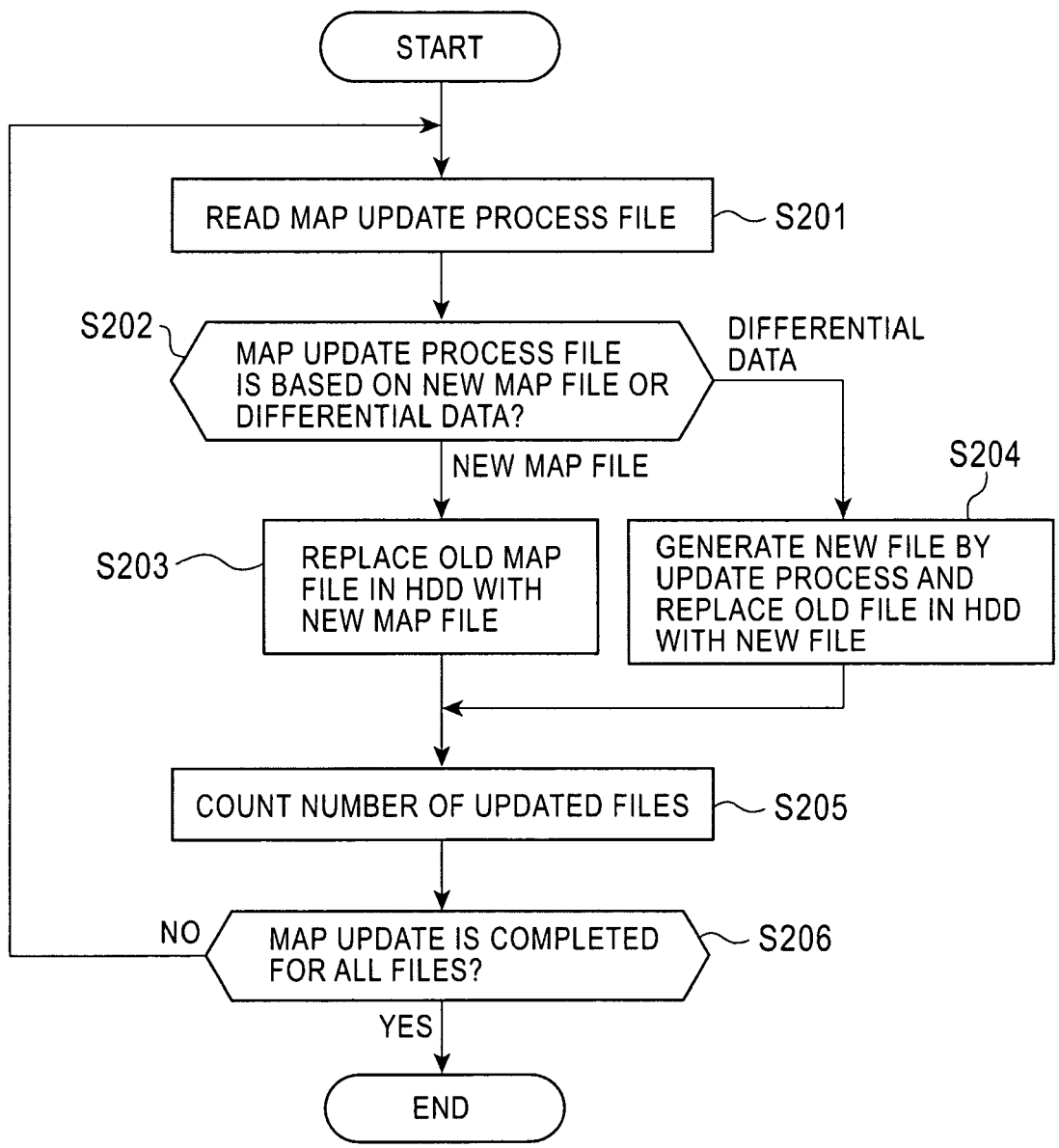
FIG. 12 is a flowchart showing a map update process in a navigation controlling unit.

FIG. 12 is a flowchart showing a map update process in the navigation controlling unit 23.

After the update DVD 15 is loaded in the DVD playback unit 24 to start the map update process, in Step S201, the navigation controlling unit 23 reads out the map update process files one by one from the update DVD 15. In Step S202, the navigation controlling unit 23 refers to the raw data flag to determine whether the map update process file is based on the new map file or on the differential data. If the map update process file is based on the new map file, then in Step S203, the navigation controlling unit 23 replaces the old map file in the hard disk 21 with the new map file. If the map update process file is based on the differential data, then in Step S204, the navigation controlling unit 23 uses the differential data and the old map file read out from the hard disk 21 to generate the new map file and replaces the old map file in the hard disk 21 with the generated new map file.

In Step S205, the navigation controlling unit 23 counts the number of updated files. In Step S206, the navigation controlling unit 23 determines whether the counted number coincides with the total number of updated files included in management data read out from the update DVD 15. If the counted number does not coincide with the total number of updated files, the navigation controlling unit 23 goes back to Step S201 to repeat the subsequent steps. If the counted number coincides with the total number of updated files, the navigation controlling unit 23 terminates the map update process.

Figure 13:
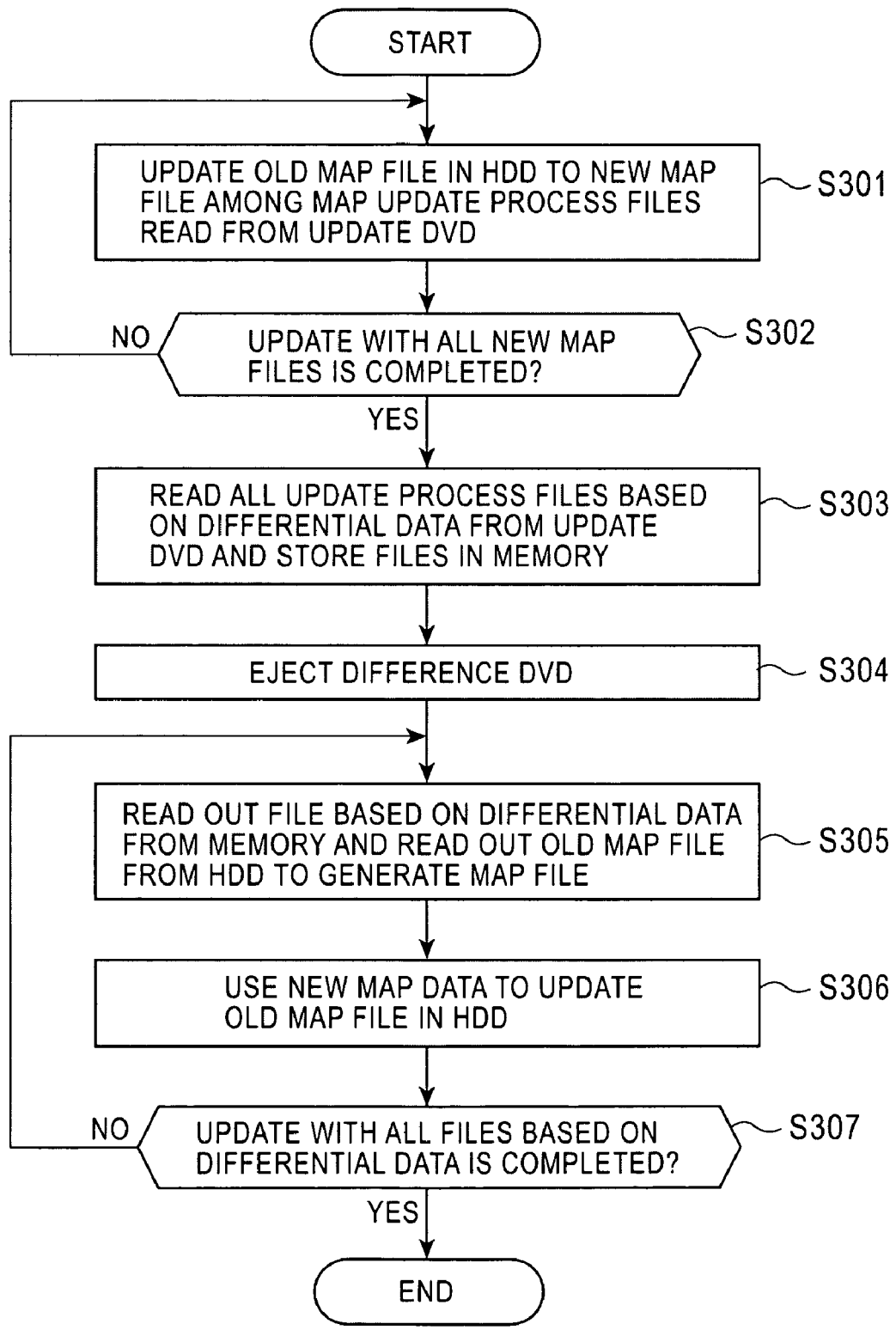
FIG. 13 is a flowchart showing another map update process in the navigation controlling unit.

FIG. 13 is a flowchart showing another map update process in the navigation controlling unit 23.

After the update DVD 15 is loaded in the DVD playback unit 24 to start the map update process, in Step S301, the navigation controlling unit 23 reads out the map update process files one by one from the update DVD 15, refers to the raw data flag to determine whether the map update process file is based on the new map file, and replaces the old map file recorded in the hard disk in the navigation apparatus with new map file if the map update process file is based on the new map file. In Step S302, the navigation controlling unit 23 determines whether the update process with all the new map files is completed. If the update process with all the new map files is not completed, the navigation controlling unit 23 goes back to Step S301 to repeat the above process.

If the update process with all the new map files is completed, then in Step S303, the navigation controlling unit 23 reads out all the files based on the differential data, among the map update process files, from the update DVD 15 and stores the readout files in a built-in memory. In Step S304, the user ejects the update DVD 15, because the update DVD 15 is not necessary for the map update, to play back a music or video DVD.

In Step S305, the navigation controlling unit 23 reads out a file based on the differential data from the memory and reads out the old map file from the hard disk to generate the new map file. In Step S306, the navigation controlling unit 23 uses the new map file to update the old map file in the hard disk. In Step S307, the navigation controlling unit 23 determines whether the update process with all the files based on the differential data is completed. If the update process with all the files based on the differential data is not completed, the navigation controlling unit 23 goes back to Step S305 to repeat the following steps for the subsequent data.

Since the recording medium (CD or DVD) for the update process is not required after the files based on the differential data are stored in the memory in the above process, it is possible to play a music or video CD (DVD).

Map Data

Figure 14A:
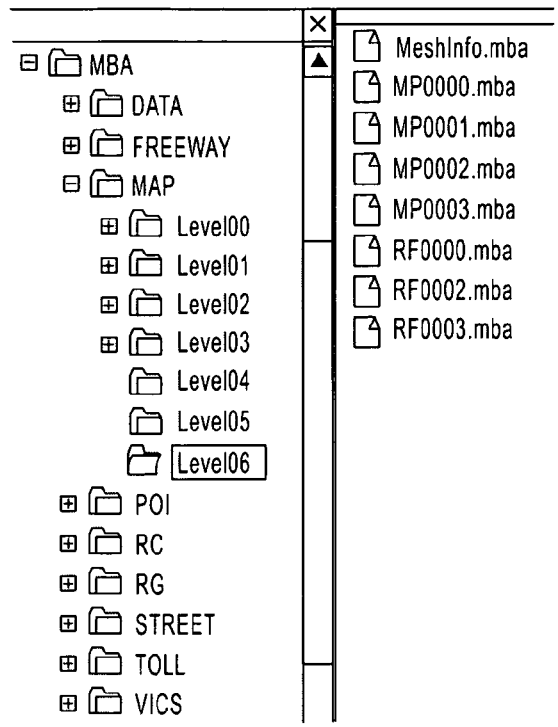
FIGS. 14A and 14B illustrate map data.

FIGS. 14A and 14B and FIGS. 15A and 15B illustrate the map data. As shown in FIG. 14A, the map data is divided into functional directories (DATA, FREEWAY, MAP, POI, RC, RG, STREET, TOLL, and VICS) for every level, area, or search tree, and the functional directories are recorded in the hard disk 21. Among the functional directories, for example, DATA includes data concerning landmarks, a junction map, and so on; FREEWAY includes freeway data; MAP includes map data; POI includes information search data; RC includes guidance route search data; and RG includes route guidance data.

The map data MAP has a directory structure and has seven levels from a detailed map (level 0) to a wide-area map (level 06). With the map of each level being divided into meshes, the map data MAP has data files MPXXXX.mba and RFXXXX.mba for displaying the map for every mesh. In the example in FIG. 14A, the level-06 map (nationwide map) is divided into four meshes and the data files for displaying the map for every mesh are MP0000.mba to MP0003.mba and RF0000.mba to RF00003.mba. The file MPXXXX.mba includes data for background, character, and symbol display and the file RFXXXX.mba includes data for road shape display.

Figure 14B:
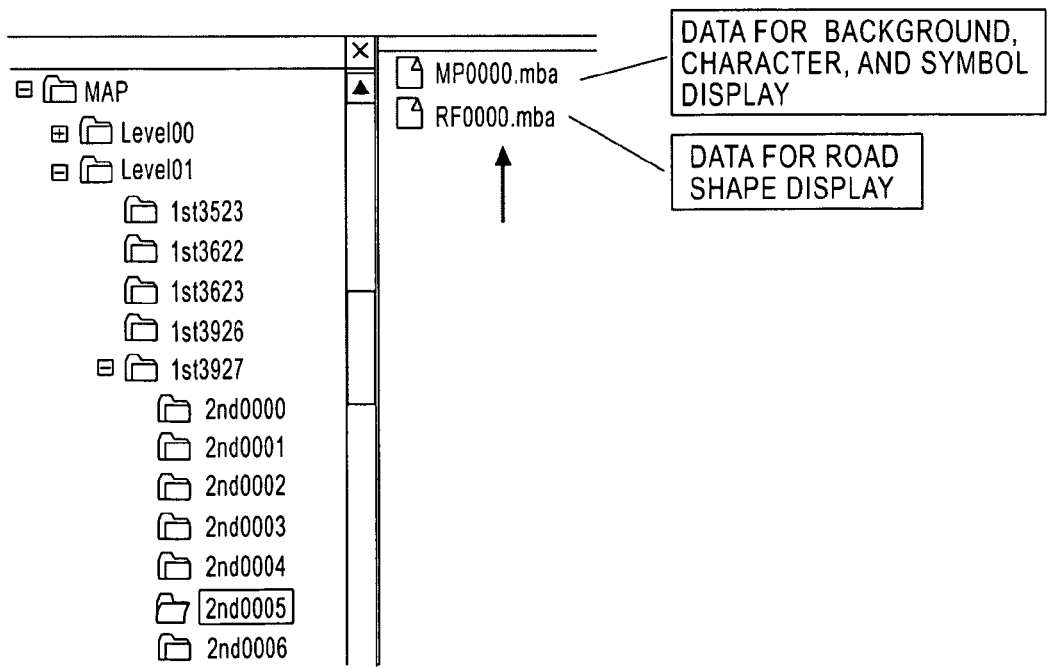

In the example in FIG. 14B, the level-01 map is divided into five primary meshes, each primary mesh is divided into seven secondary meshes, and data files for displaying a certain secondary mesh are MP0000.mba and RF0000.mba. In the above directory structure, data files MP0000.mba and RF0000.mba required for displaying the map can be acquired by sequentially following the directories Level01, 1st3927, and 2nd0005.

Figure 15A:
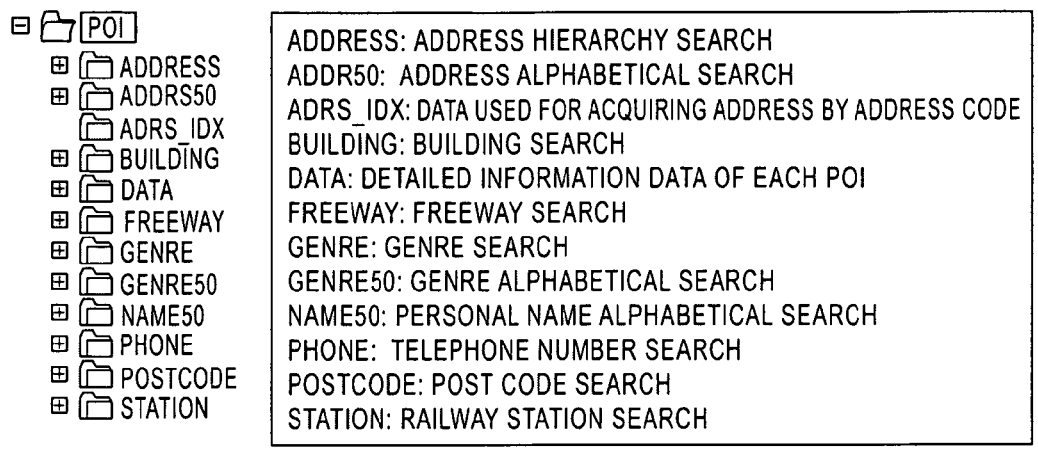
FIGS. 15A and 15B illustrate map data.

FIG. 15A shows an example of the structure of the information search data POI. The information search data POI is structured in directories for every search item so as to allow address search, address alphabetical search, building search, freeway search, genre search, telephone number search, and so on.

Figure 15B:
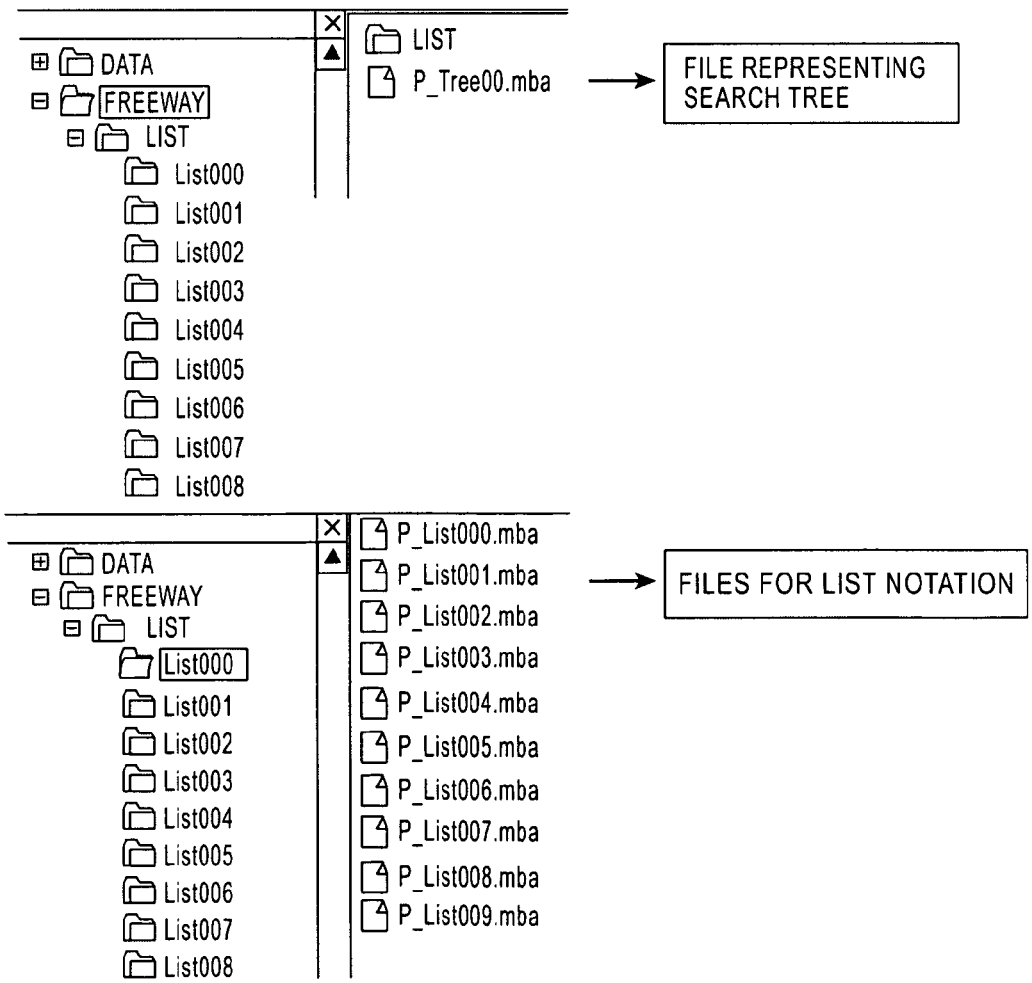

FIG. 15B shows an example of the structure of the freeway search data FREEWAY. The freeway search data FREEWAY has two child directories LIST and P_Tree00.mba. P_Tree00.mba is a file representing a search tree. The directory LIST has List000 to List 008 corresponding to nine districts. The list List000 has files P_List000.mba to P_List009.mba indicating ten freeways.

Update data (Map Update Process Data)

Figure 16A:
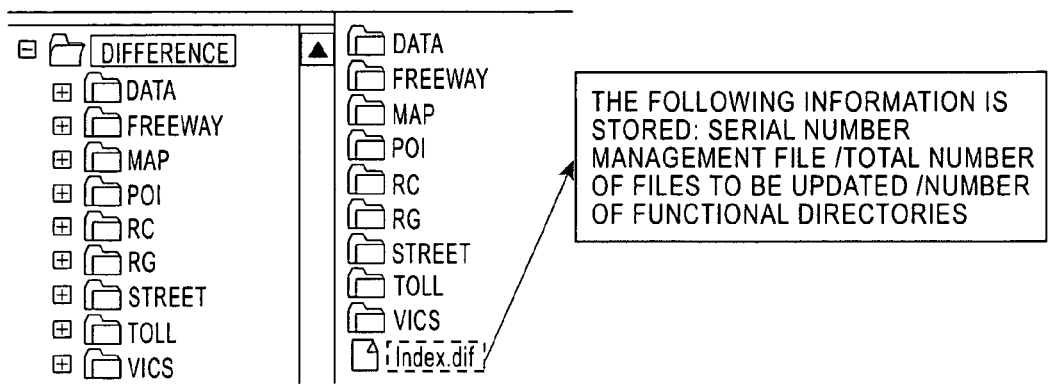
FIGS. 16A and 16B illustrate update data.

FIGS. 16A to 19B illustrate the update data. The update data (difference) has functional directories (DATA, FREEWAY, MAP, POI, RC, RG, STREET, TOLL, and VICS) including the files to be updated and a file Index.dif, as shown in FIG. 16A. The file Index.dif identifies (1) the version numbers before and after the update, (2) the total number of files to be updated, and (3) the number of functional directories to be updated.

Figure 16B:
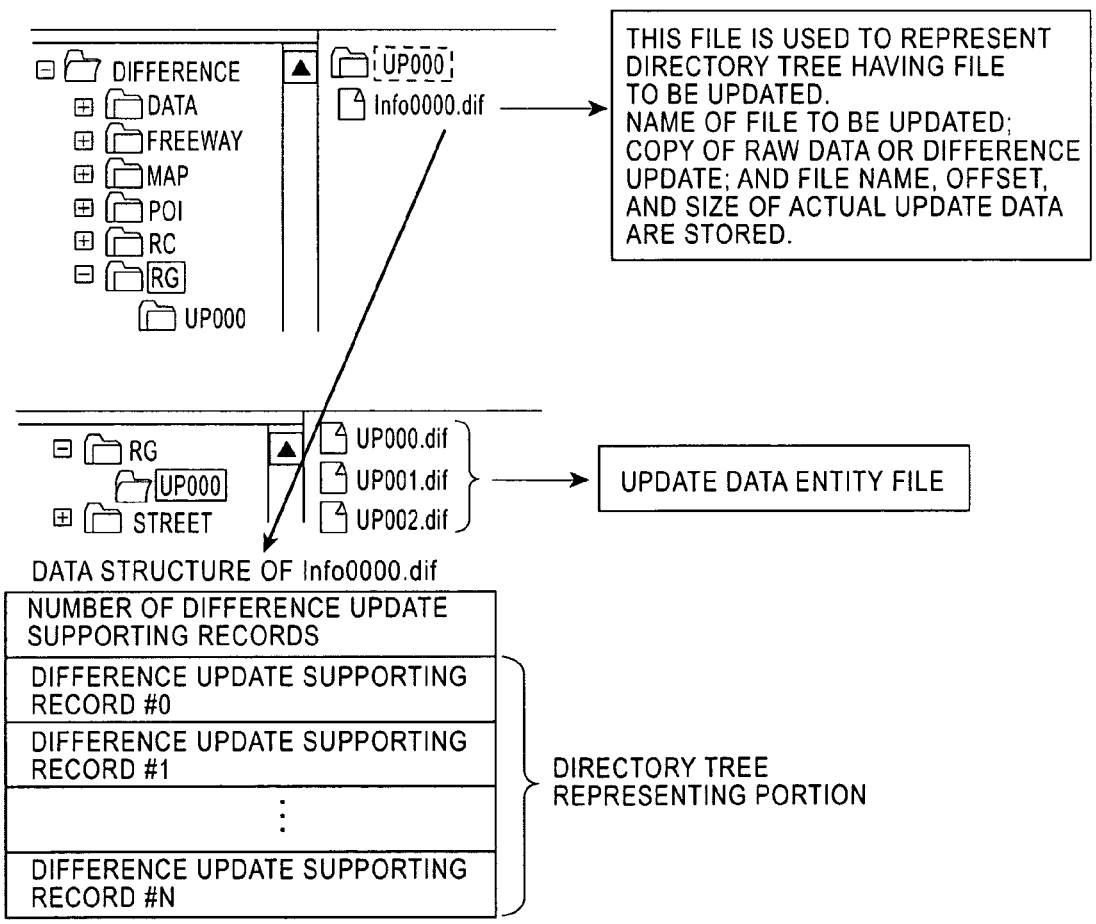

The map update process files (files to be updated) are indicated in a directory structure for every function. FIG. 16B illustrates the directory structure of the functional directory RG (route guidance data), which has directories UP000 and Info0000.dif. The directory UP000 indicates an update data entity file (UP000.dif to UP002.dif), and the directory Info0000.dif indicates multiple lower-level difference update supporting records #0 to #N.

The difference update supporting record includes the following information, as shown in FIG. 17A:

(1) processing state (whether the target directory and files and subdirectories below the target directory have been processed)

(2) the name of the target directory (3) the number of the subdirectories (lower-level directories)

(4) the number of the files below the target directory (5) difference update supporting records numbers corresponding to the subdirectories (6) difference update information record numbers corresponding to the files below the target directory In the example shown in FIG. 17B, since the target directory is MBA\RG\LEVEL01, the name of the directory is "LEVEL01". The number of subdirectories is three and the number of files below this directory is zero. Since the number of subdirectories is three, the corresponding three difference update supporting record numbers #X(1st3622), #X+1 (1st3623), and #X+2(1st3624) are indicated. However, since the number of files below this directory is zero, no difference update information record number is indicated.

Figure 18A:
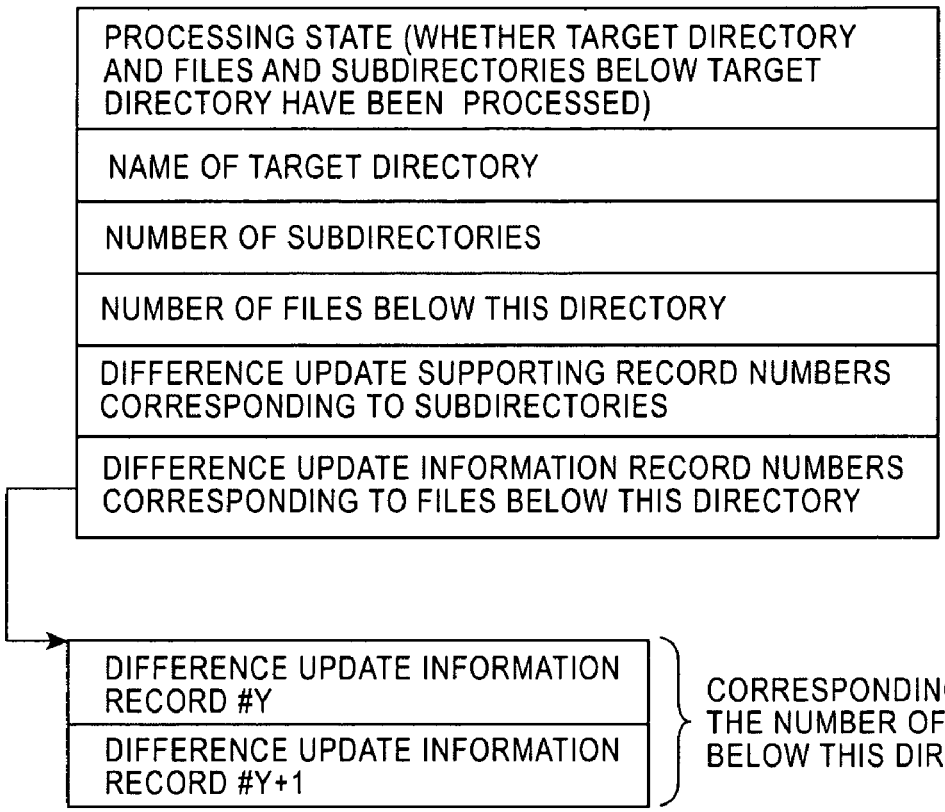
FIGS. 18A and 18B include other diagrams illustrating the difference update supporting record.
Figure 18B:
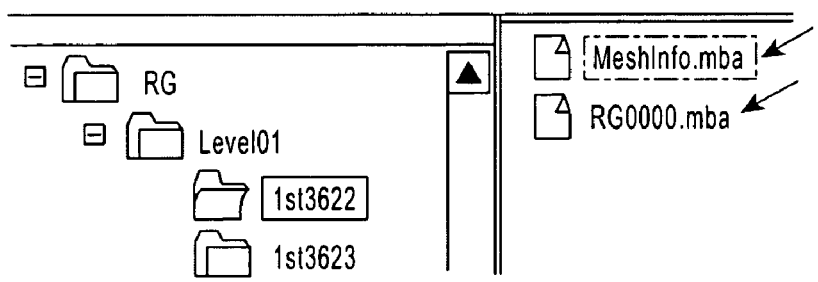
Figure 19:
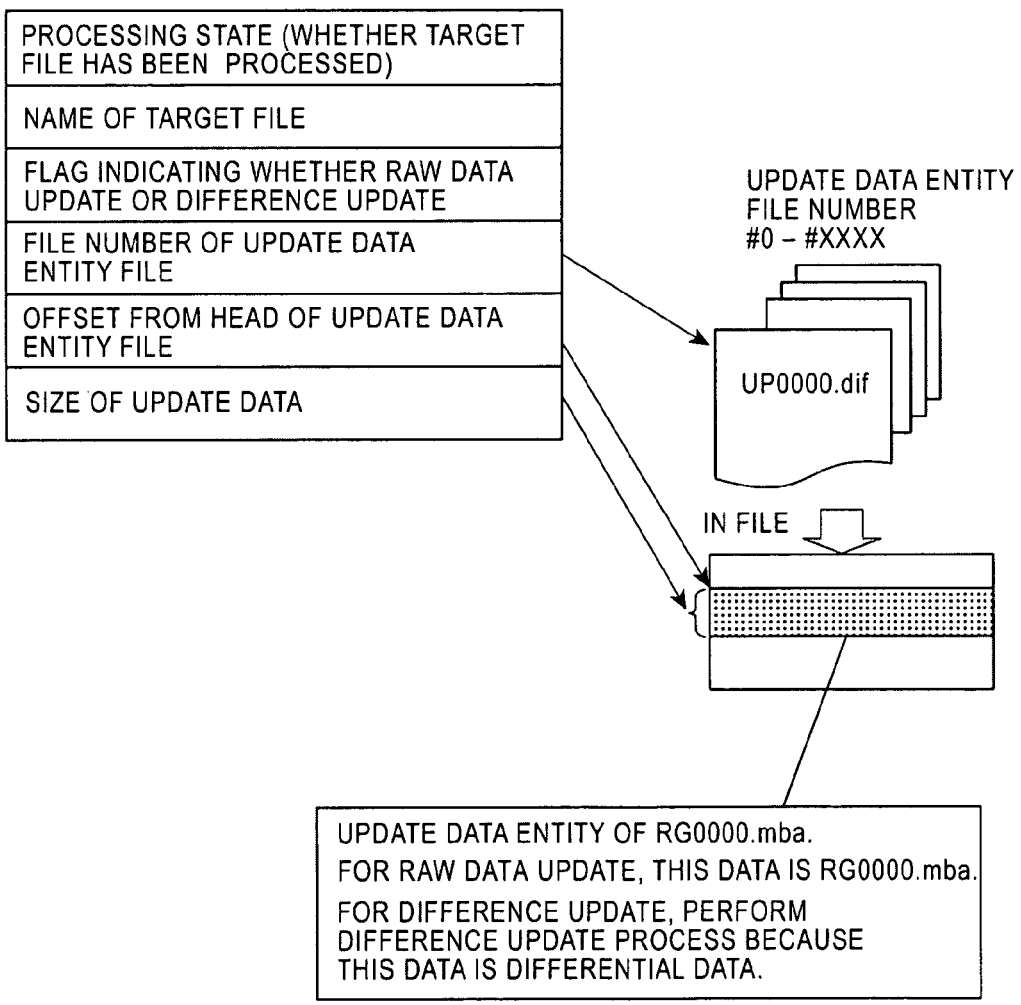
FIG. 19 illustrates a difference update information record.
Figure 20:
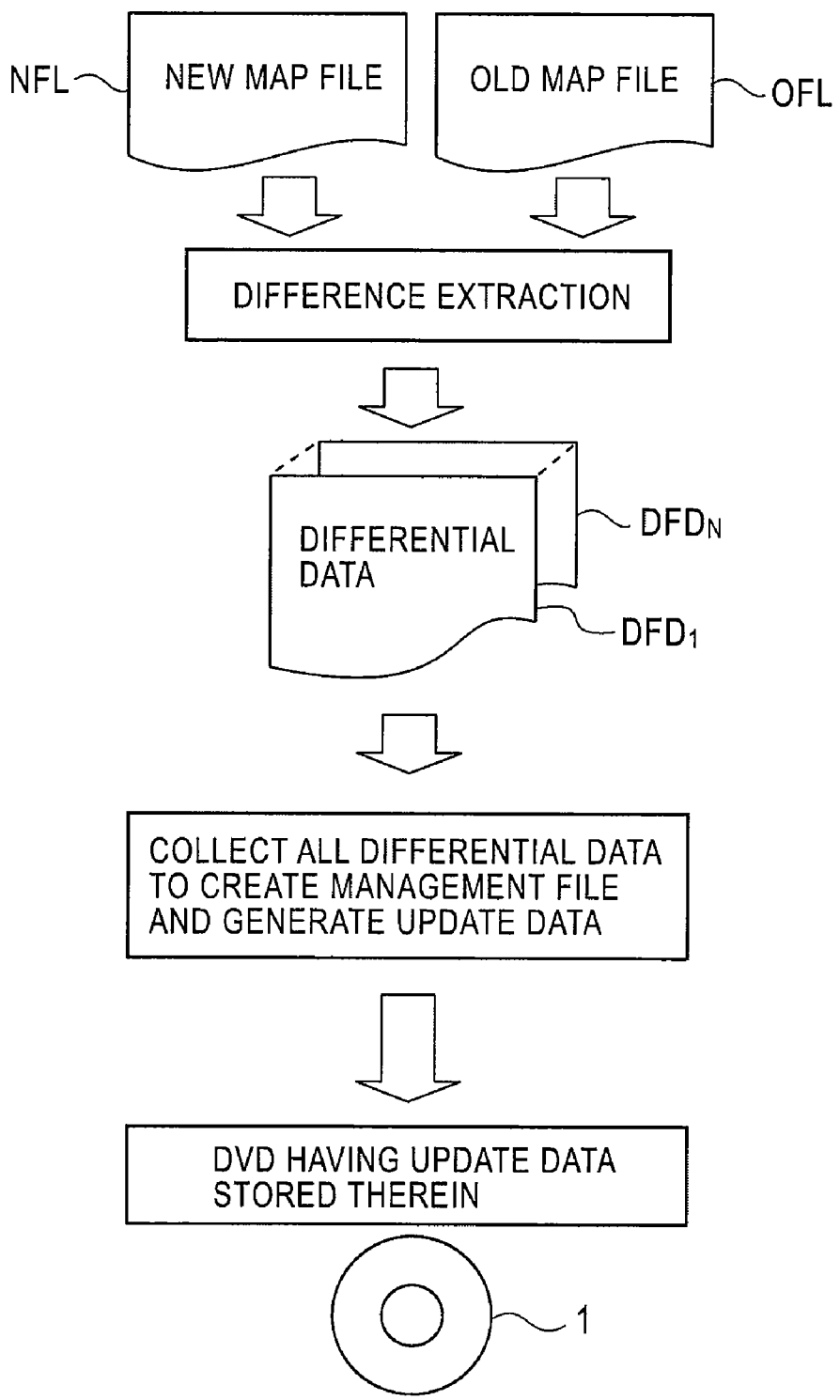
FIG. 20 schematically illustrates creation of an update DVD with a map differential-data generating apparatus in the related art.
Figure 21:
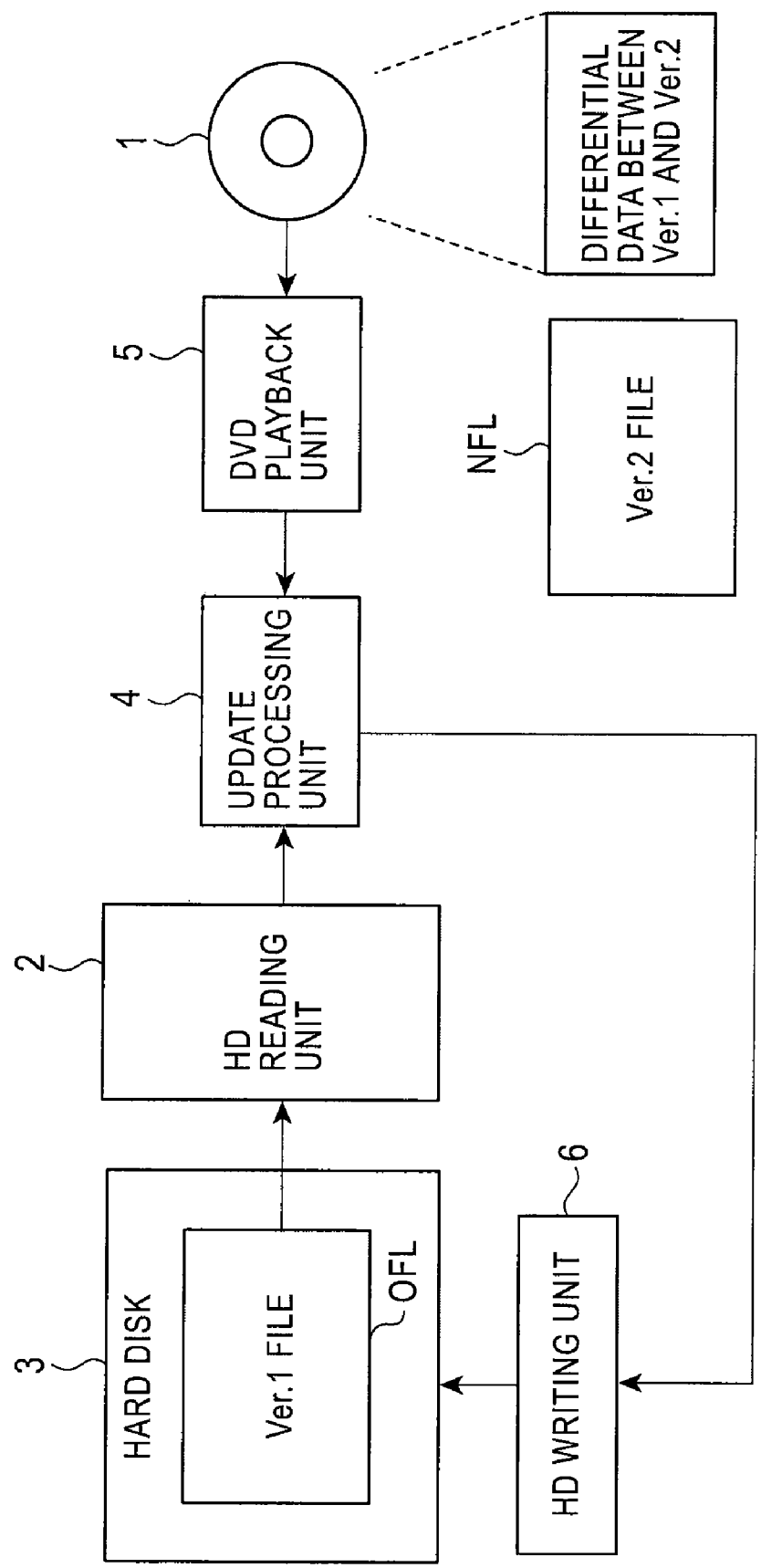
FIG. 21 illustrates an update process in a navigation apparatus that uses the update DVD to update old map data in an HDD to new map data in the related art.

FIGS. 18A and 18B illustrate another example of the difference update supporting record, in which the number of subdirectories is zero, the number of files is two, and the name of the directory is "1st3622". Since the number of subdirectories is zero, no difference update supporting record number is indicated. However, since the number of files below this directory is two, two difference update information record numbers (identifying the map update process files) "1st3622" and "1st3623" are indicated.

FIGS. 19A and 19B illustrate an example of the difference update information record number identifying a file (map update process file), which includes the following information:

(1) processing state (whether the target map update process file has been processed)

(2) the name of the target map update process file (3) the raw data flag (indicating whether the map update process file is based on the new map file or the differential data)

(4) the file number of the update data entity file (5) offset from the head of the update data entity file (6) the size of the update data The update data entity file indicated by the update data entity file number is the new map file if the raw data flag is turned on and is the differential data if the raw data flag is turned off.

According to the present invention, it is possible to shorten the time required for map update and to allow the background update process to be performed because only one update DVD is used.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method of generating map update process data used for updating old map data including a plurality of files to new map data on a file-by-file basis, the method comprising the steps of:

using an old map file to be updated and a new map file to generate differential data;

calculating a relative size of the differential data with respect to the size of a map file; and using the new map file if the relative size is higher than a predetermined value and using the differential data if the relative size is lower than the predetermined value to form the map update process data.

2. The method of generating the map update process data, according to claim 1, further comprising the step of:

generating data indicating whether a map update process file in the map update process data is based on the new map file or on the differential data and including the generated data in the map update process data.

3. The method of generating the map update process data, according to claim 1, further comprising the step of:

writing the map update process data for all the old map files to be updated in a recording medium to form an update recording medium.

4. The method of generating the map update process data, according to claim 3, further comprising the step of:

setting the predetermined value on the basis of a capacity of the update recording medium.

5. The method of generating the map update process data, according to claim 1,
wherein the relative size is the relative size of the differential data with respect to the size of the new map file.

6. The method of generating the map update process data, according to claim 4,
wherein the predetermined value is set such that the entire map update process data is recorded in one recording medium.

7. The method of generating the map update process data, according to claim 2,
wherein the map update process data is structured in a directory structure, and
wherein the map update process file in the directory structure includes the data indicating whether the map update process file is based on the new map file or on the differential data.

8. A map update method for a navigation apparatus that uses map update process data used for updating old map data including a plurality of files to new map data to update a map, the map update method comprising the steps of:
determining whether a map update process file in the map update process data is based on a new map file or differential data between an old map file and the new map file;
replacing an old map file stored in a map data storage unit in the navigation apparatus with the new map file if the map update process file is based on the new map file; and
generating the new map file by using the differential data and the old map file to replace the old map file stored in the map data storage unit with the new map file if the map update process file is based on the differential data.

9. The map update method according to claim 8, further comprising the steps of:
reading out the map update process file based on the new map file, among the map update process files in the map update process data, from a recording medium and replacing the old map file stored in the map data storage unit in the navigation apparatus with the new map file; and
reading out all the map update process files based on the differential data, among the map update process files, from the recording medium and storing the readout map update process files in a memory,
wherein, subsequently, the map update process files based on the differential data and the old map file are used to generate the new map file, and the old map file stored in the map data storage unit is replaced with the new map file.

10. The map update method according to claim 8, further comprising the steps of:
acquiring the map update process file from a recording medium and acquiring the old map file from the map data storage unit;
writing the updated data in the map update process file after an update process is finished and counting the number of updated files; and
determining that the update process is completed if the counted number of updated files coincides with the total number of updated files recorded in the recording medium.

11. An apparatus for generating map update process data used for updating old map data including a plurality of files to new map data on a file-by-file basis, the apparatus comprising:

a map file input unit that receives an old map file and a new map file; and
a processing unit that generates differential data between the old map file to be updated and the new map file, that calculates a relative size of the differential data with respect to the size of a map file, that uses the new map file to generate a map update process file if the relative size is higher than a predetermined value and uses the differential data to generate the map update process file if the relative size is lower than the predetermined value, and that uses the generated map update process files to form the map update process data.

12. The apparatus for generating the map update process data, according to claim 11, further comprising:
an update-recording-medium forming unit that writes the map update process data in a recording medium to form an update recording medium.

13. The apparatus for generating the map update process data, according to claim 12,
wherein the processing unit sets the predetermined value on the basis of a capacity of the update recording medium.

14. The apparatus for generating the map update process data, according to claim 11,
wherein the processing unit includes:
a differential data generator that generates the differential data by using the old map file and the new map file;
a relative size calculator that calculates the relative size of the differential data; and
a map-update-process file generator that uses the new map data to generate the map update process file if the relative size is higher than the predetermined value and uses the differential data to generate the map update process file if the relative size is lower than the predetermined value.

15. The apparatus for generating the map update process data, according to claim 11,
wherein the processing unit calculates the relative size of the differential data with respect to the size of the new map file as the relative size.

16. The apparatus for generating the map update process data, according to claim 11,
wherein the processing unit generates data indicating whether the map update process file is based on the new map file or on the differential data and includes the generated data in the map update process data.

17. The apparatus for generating the map update process data, according to claim 11,
wherein the processing unit sets the predetermined value such that the entire map update process data is recorded in one recording medium.

18. The apparatus for generating the map update process data, according to claim 16,
wherein the processing unit structures the map update process data in a directory structure, and includes the data indicating whether the map update process file is based on the new map file or on the differential data in the map update process file in the directory structure.

19. A navigation apparatus that uses map update process data used for updating old map data including a plurality of files to new map data to update a map, the navigation apparatus comprising:
a map data storage unit that stores the old map data;
a map data reading-writing control unit that reads out the old map data from the map data storage unit and writes the new map data in the map data storage unit;

a map-update-process data input unit that receives the map update process data; and a map update processing unit that determines whether a map update process file in the map update process data is based on a new map file or on differential data between an old map file and the new map file, that replaces an old map file stored in the map data storage unit with the new map file if the map update process file is based on the new map file, and that uses the differential data and the old map data stored in the map data storage unit to generate the new map file and replaces the old map file stored in the map data storage unit with the new map file if the map update process file is based on the differential data.

20. The navigation apparatus according to claim 19, wherein, after an update process is finished for one map update process file, the map update processing unit writes the updated data in the map update process file, counts the number of updated files, and completes the update process if the counted number of updated files coincides with the total number of updated files recorded in a recording medium.

21. A map data update method for updating old map data including a plurality of files to new map data on a file-by-file basis, the map data update method comprising the steps of;

using an old map file to be updated and a new map file to generate differential data;

calculating a relative size of the differential data with respect to the size of the new map file;

using the new map file if the relative size is higher than a predetermined value and using the differential data if the relative size is lower than the predetermined value to form the map update process data;

writing the map update process data in a recording medium to form an update recording medium; and replacing the old map file stored in a map data storage unit in a navigation apparatus with the new map file if a map update process file read out from the update recording medium is based on the new map file, and generating the new map file by using the differential data and the old map file to replace the old map file stored in the map data storage unit with the new map file if the map update process file is based on the differential data.

22. The map data update method according to claim 21, wherein data indicating whether the map update process file is based on the new map file or on the differential data is included in the update recording medium storing the map update process data.

23. A map data update system that updates old map data to new map data, the map data update system comprising:

an apparatus for generating map update process data used for updating the old map data including a plurality of files to the new map data on a file-by-file basis; and a navigation apparatus for using the map update process data to update a map, wherein the apparatus for generating the map update process data includes:

a map file input unit that receives an old map file and a new map file;

a processing unit that generates differential data between the old map file to be updated and the new map file, that calculates a relative size of the differential data with respect to the size of a map file, that uses the new map file to generate a map update process file if the relative size is higher than a predetermined value and uses the differential data to generate the map update process file if the relative size is lower than the predetermined value, and that uses the generated map update process files to form the map update process data; and an update-recording-medium forming unit that writes the map update process data in a recording medium to form an update recording medium, and wherein the navigation apparatus includes:

a map data storage unit that stores the old map data;

a map data reading-writing control unit that reads out the old map data from the map data storage unit and writes the new map data in the map data storage unit;

a map-update-process data input unit that receives the map update process data; and a map update processing unit that determines whether the map update process file in the map update process data is based on the new map file or on the differential data, that replaces the old map file stored in the map data storage unit with the new map file if the map update process file is based on the new map file, and that uses the differential data and the old map data stored in the map data storage unit to generate the new map file and replaces the old map file stored in the map data storage unit with the new map file if the map update process file is based on the differential data.

* * * * *

UNITED STATES PATENT AND TRADEMARK OFFICE
CERTIFICATE OF CORRECTION

PATENT NO. : 7,490,006 B2
APPLICATION NO. : 11/349533
DATED : February 10, 2009
INVENTOR(S) : Minoru Sekine et al.

Page 1 of 1

It is certified that error appears in the above-identified patent and that said Letters Patent is hereby corrected as shown below:

On the Title Page

In column 1, item (73), immediately after "Tokyo (JP)" insert --; Mobilemedia Brain Association, Inc., Tokyo (JP)--.

Signed and Sealed this

Sixteenth Day of June, 2009

JOHN DOLL
*Acting Director of the United States Patent and Trademark Office*